(12) United States Patent
Hano et al.

(10) Patent No.: US 11,514,786 B2
(45) Date of Patent: Nov. 29, 2022

(54) VEHICLE-MOUNTED DEVICE, RECORDING MEDIUM, AND NOTIFICATION METHOD

(71) Applicant: Faurecia Clarion Electronics Co., Ltd., Saitama (JP)

(72) Inventors: Tsuyoshi Hano, Saitama (JP); Takashi Yamaguchi, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 54 days.

(21) Appl. No.: 16/762,463

(22) PCT Filed: Oct. 4, 2018

(86) PCT No.: PCT/JP2018/037223
§ 371 (c)(1),
(2) Date: May 7, 2020

(87) PCT Pub. No.: WO2019/093032
PCT Pub. Date: May 16, 2019

(65) Prior Publication Data
US 2020/0365021 A1    Nov. 19, 2020

(30) Foreign Application Priority Data
Nov. 9, 2017  (JP) .............................. JP2017-216082

(51) Int. Cl.
*G08G 1/0969* (2006.01)
*G01C 21/34* (2006.01)
*G01C 21/36* (2006.01)

(52) U.S. Cl.
CPC ....... *G08G 1/0969* (2013.01); *G01C 21/3415* (2013.01); *G01C 21/362* (2013.01); *G01C 21/3655* (2013.01)

(58) Field of Classification Search
CPC .............. G01C 21/3415; G01C 21/362; G01C 21/3655; G01C 21/3688; G08G 1/0969; G08G 1/005; G09B 29/00; G09B 29/10
See application file for complete search history.

(56) References Cited

U.S. PATENT DOCUMENTS

2009/0281725 A1\* 11/2009 Sakata ................... G01C 21/32
701/532
2015/0120183 A1\* 4/2015 Annapureddy ......... G01S 19/51
701/430
(Continued)

FOREIGN PATENT DOCUMENTS

JP    2009-250703    10/2009

OTHER PUBLICATIONS

International Search Report and Written Opinion of corresponding PCT/JP/2018/037223, dated Dec. 11, 2018 with English translation of ISR, 8 pages.
(Continued)

*Primary Examiner* — Navid Z. Mehdizadeh
(74) *Attorney, Agent, or Firm* — Volpe Koenig

(57) ABSTRACT

This vehicle-mounted device installed in a vehicle is provided with a communication unit that communicates with a mobile terminal; a vehicle information acquiring unit that acquires operation information of the vehicle; and a vehicle-mounted controller that, on the basis of an operating status of the vehicle-mounted device, transmits a first notification notifying the mobile terminal of the possibility that the vehicle has stopped to the mobile terminal via the communication unit and that, on the basis of the operation information of the vehicle, transmits a second notification notifying the mobile terminal that the vehicle has stopped to the mobile terminal via the communication unit.

9 Claims, 9 Drawing Sheets

NOTIFICATION CONDITION TABLE

| NOTIFICATIONS | | | EVENTS | | | | | |
|---|---|---|---|---|---|---|---|---|
| PRIORITY LEVEL | CONFIR-MATION | DISPLAY CONTENT | MID-JOURNEY REST | PARKING LOT ARRIVAL | WRONG-WAY TRAVEL | ARRIVAL AT DESTINATION | DESIGNATED TIME | RETURN HOME |
| ↑ HIGH | Y | START OF WALKING NAVIGATION | | ○ | | | | |
|  | — | START OF RETURN HOME | | | | | | ○ |
|  | — | AGGREGATE TIME | | | | | ○ | |
|  | Y | RECOMMENDATION INFORMATION | ○ | | | ○ | | |
|  | Y | VICS INFORMATION | ○ | | | | | |
|  | — | ETC CHARGE | ○ | ○ | | ○ | | ○ |
|  | Y | WRONG-WAY TRAVEL ALERT | | | ○ | | | |
| LOW | — | COIN-OPERATED PARKING USAGE START AND CHARGE | | ○ | | | | |
| ↓ | Y | DISTANCE TRAVELED AND FUEL CONSUMPTION COSTS EVENTS | ○ | | | | | ○ |

(56) References Cited

U.S. PATENT DOCUMENTS

2017/0092127 A1    3/2017  Nakaya
2018/0144622 A1*   5/2018  Gage ..................... G08G 1/005
2018/0313663 A1*  11/2018  Kobayashi ............. H04M 1/00
2018/0372505 A1*  12/2018  Frederick ........... G01C 21/3644

OTHER PUBLICATIONS

Extended European Search Report dated Jul. 2, 2021 for corresponding European Application No. 18876443.5 (8 pages).
Japanese Office Action dated Jul. 13, 2021 regarding Japanese Patent Application No. 2017-216082 corresponding to U.S. Appl. No. 16/762,463 (3 pages) with English Translation (3 pages).

* cited by examiner

FIG. 2

| | EVENT LIST TABLE 29A | | | | | |
|---|---|---|---|---|---|---|
| CONDITIONS | EVENTS | | | | | |
| | MID-JOURNEY REST | PARKING LOT ARRIVAL | WRONG-WAY TRAVEL | ARRIVAL AT DESTINATION | DESIGNATED TIME | RETURN HOME |
| CURRENT POSITION IS POSITION OTHER THAN DESTINATION PARKING LOT EN ROUTE AND DESTINATION | ○ | | | | | |
| CURRENT POSITION IS DESTINATION PARKING LOT | | ○ | | | | |
| AFTER ARRIVING AT DESTINATION PARKING LOT, FAR FROM DESTINATION | | | ○ | | | |
| CURRENT POSITION IS DESTINATION | | | | ○ | | |
| DESIGNATED TIME MATCH | | | | | ○ | |
| CURRENT POSITION IS CLOSE TO HOME | | | | | | ○ |

FIG. 3

NOTIFICATION CONDITION TABLE (29B)

| PRIORITY LEVEL | NOTIFICATIONS | | EVENTS | | | | | |
|---|---|---|---|---|---|---|---|---|
| | CONFIR-MATION | DISPLAY CONTENT | MID-JOURNEY REST | PARKING LOT ARRIVAL | WRONG-WAY TRAVEL | ARRIVAL AT DESTINATION | DESIGNATED TIME | RETURN HOME |
| ↑ HIGH | Y | START OF WALKING NAVIGATION | | O | | | | |
| | — | START OF RETURN HOME AGGREGATE TIME | | | | | | O |
| | — | RECOMMENDATION INFORMATION | | | | | O | |
| | Y | VICS INFORMATION | O | | | O | | |
| | — | ETC CHARGE | O | O | | O | | |
| | Y | WRONG-WAY TRAVEL ALERT | | | O | | | |
| LOW | — | COIN-OPERATED PARKING USAGE START AND CHARGE | | O | | | | O |
| ↓ | Y | DISTANCE TRAVELED AND FUEL CONSUMPTION COSTS EVENTS | O | | | | | O |

FIG. 5
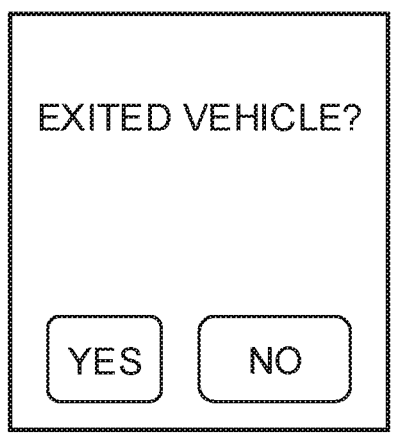
(a)
(b)
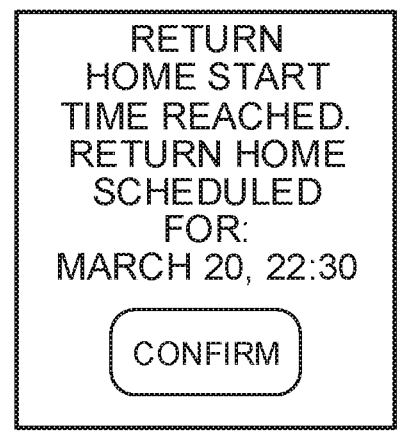
(c)

VEHICLE-MOUNTED DEVICE, RECORDING MEDIUM, AND NOTIFICATION METHOD

CROSS-REFERENCE TO RELATED APPLICATION(S)

This application is a U.S. National Phase Patent Application and claims priority to and the benefit of International Application Number PCT/JP2018/037223, filed on Oct. 4, 2018, which claims priority of Japanese Patent Application Number 2017-216082, filed on Nov. 9, 2017, the entire contents of all of which are incorporated herein by reference.

TECHNICAL FIELD

The present invention relates to a vehicle-mounted device, a recording medium, and a notification method.

BACKGROUND ART

Movement to a destination that is unreachable by vehicle alone entails both movement by vehicle to the parking lot nearest to the destination and movement on foot from the parked car to the destination, for example. Navigation to such a destination involves both vehicle navigation to the parking lot and walking navigation from the parking lot to the destination. PTL 1 discloses a vehicle-mounted device that performs route guidance in conjunction with a mobile terminal, comprising: a route guidance unit that performs route guidance to a destination; a parking determination unit that determines whether a vehicle in which the vehicle-mounted device is installed is in a parked state; and a notification unit that, when a parked state is determined by the parking determination unit, notifies the mobile terminal of route guidance information which the vehicle-mounted device has.

CITATION LIST

Patent Literature

[PTL 1] Japanese Unexamined Patent Application Publication No. 2009-250703

SUMMARY OF INVENTION

Technical Problem

The invention disclosed in PTL 1 is unable to deal with cases where it is unclear that a vehicle has stopped.

Solution to Problem

A vehicle-mounted device according to a first embodiment of the present invention is a vehicle-mounted device installed in a vehicle, comprising: a communication unit that communicates with a mobile terminal; a vehicle information acquiring unit that acquires operation information of the vehicle; and a vehicle-mounted controller that, on the basis of an operating status of the vehicle-mounted device, transmits a first notification notifying the mobile terminal of the possibility that the vehicle has stopped to the mobile terminal via the communication unit and that, on the basis of the operation information of the vehicle, transmits a second notification notifying the mobile terminal that the vehicle has stopped to the mobile terminal via the communication unit.

A recording medium according to a second embodiment of the present invention is computer-readable and records a notification program for causing a vehicle-mounted device that communicates with a mobile terminal installed in a vehicle to execute the steps of: acquiring an operating status of the vehicle-mounted device; acquiring operation information of the vehicle; and transmitting, on the basis of the operating status of the vehicle-mounted device, a first notification notifying the mobile terminal of the possibility that the vehicle has stopped and transmitting, on the basis of the operation information of the vehicle, a second notification notifying the mobile terminal that the vehicle has stopped, to the mobile terminal.

A notification method according to a third embodiment of the present invention is a notification method which is executed in a vehicle-mounted device that is installed in a vehicle and that communicates with a mobile terminal, comprising the steps of: acquiring an operating status of the vehicle-mounted device; acquiring operation information of the vehicle; and transmitting, on the basis of the operating status of the vehicle-mounted device, a first notification notifying the mobile terminal of the possibility that the vehicle has stopped to the mobile terminal and transmitting, on the basis of the operation information of the vehicle, a second notification notifying the mobile terminal that the vehicle has stopped to the mobile terminal.

Advantageous Effects of Invention

According to the present invention, the vehicle-mounted device is capable of notifying a mobile terminal of the possibility that a vehicle has stopped.

BRIEF DESCRIPTION OF DRAWINGS

FIG. 2 is a diagram illustrating an example of an event list table 29A.

FIG. 3 is a diagram illustrating an example of a notification condition table 29B.

FIG. 5(a) is a diagram illustrating a vehicle exit confirmation screen, FIG. 5(b) is a diagram illustrating a walking navigation start confirmation screen, and FIG. 5(c) is a diagram illustrating a return home time notification screen.

DESCRIPTION OF EMBODIMENTS

Embodiment

An embodiment of the notification system will be described herein with reference to FIGS. 1 to 7.

(System Configuration)

Figure 1:
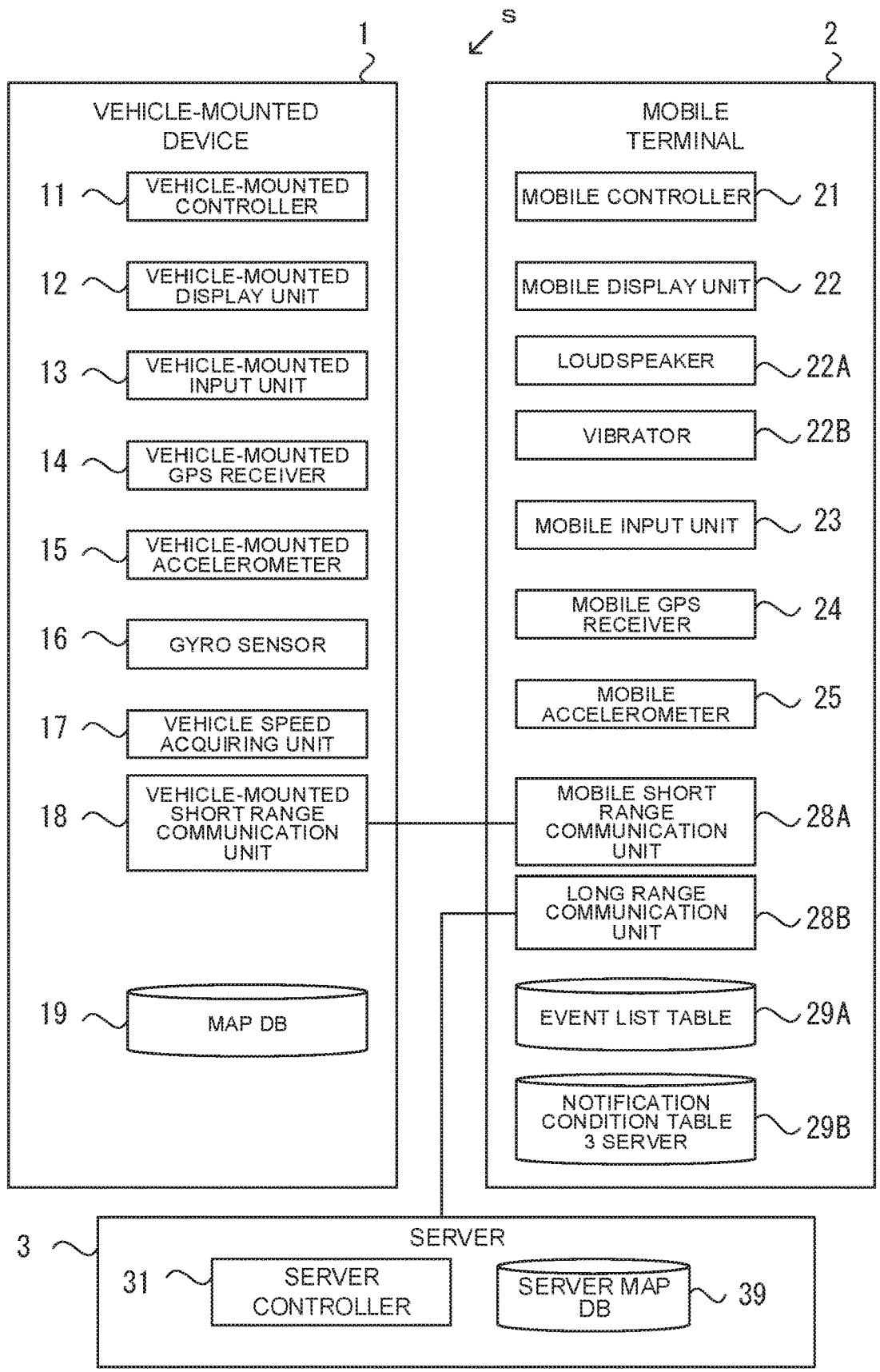
FIG. 1 is a diagram of a configuration of a notification system S.

A notification system S illustrated in FIG. 1 is provided with a vehicle-mounted device 1, a mobile terminal 2, and a server 3. The vehicle-mounted device 1 performs short range radio communication with the mobile terminal 2, and the mobile terminal 2 performs long range radio communication with the server 3. In the embodiment described hereinbelow, a user always carries the mobile terminal 2. The user rides in a vehicle (hereinafter "own vehicle") in which the vehicle-mounted device 1 is installed and moves to a parking lot close to a destination (hereinafter "destination parking lot") and moves from the destination parking lot to the destination by walking. In the present embodiment, a vehicle navigation system is also called "vehicle navigation" and a walking navigation system is also called "walking navigation".

The vehicle-mounted device 1 is provided with a vehicle-mounted controller 11, a vehicle-mounted display unit 12, a vehicle-mounted input unit 13, a vehicle-mounted GPS receiver 14, a vehicle-mounted accelerometer 15, a gyro sensor 16, a vehicle speed acquiring unit 17, a vehicle-mounted short range communication unit 18, and a map database (hereinafter map DB) 19.

The vehicle-mounted controller 11 is provided with a CPU, a ROM, and a RAM, which are not illustrated. The CPU realizes functions (described subsequently) by expanding a program, which is stored in the ROM, in the RAM and executing the program. The vehicle-mounted controller 11 outputs operating instructions to the vehicle-mounted display unit 12 and the vehicle-mounted short range communication unit 18. The vehicle-mounted display unit 12 is, for example, a liquid crystal display, and displays video on the basis of operating instructions from the vehicle-mounted controller 11.

The vehicle-mounted input unit 13 is, for example, buttons, and outputs operating inputs by the user to the vehicle-mounted controller 11. The vehicle-mounted input unit 13 also includes a power button for turning off the power supply of the vehicle-mounted device 1. Furthermore, when an ignition switch of the own vehicle is turned off by the user, this operation is relayed to the vehicle-mounted input unit 13 via a signal line (not illustrated), and the vehicle-mounted input unit 13 outputs the same signal as when the power button is pressed to the vehicle-mounted controller 11. Note that, upon receiving this signal, the vehicle-mounted controller 11 performs an end preparation to stop the operation of the vehicle-mounted device 1, and when this preparation is complete, the vehicle-mounted controller 11 stops the operation of the vehicle-mounted device 1, that is, disconnects the power supply.

The vehicle-mounted GPS receiver 14 receives radio waves from a plurality of satellites constituting a satellite navigation system and calculates the position, that is, the latitude and longitude, of the own vehicle by analyzing the signals contained in the radio waves. The vehicle-mounted GPS receiver 14 outputs the calculated latitude and longitude to the vehicle-mounted controller 11. The vehicle-mounted accelerometer 15 is a triaxial accelerometer, for example, that measures the acceleration of the own vehicle and outputs same to the vehicle-mounted controller 11. The gyro sensor 16 measures the direction of travel of the own vehicle and outputs same to the vehicle-mounted controller 11. The vehicle speed acquiring unit 17 receives the output of a speedometer, which the own vehicle is provided with, via a signal line (not illustrated), and outputs vehicle speed information to the vehicle-mounted controller 11.

The vehicle-mounted short range communication unit 18 is a communication device with a narrow communication range that is Bluetooth (registered trademark)—compatible or IEEE 802.11-compatible, for example. The vehicle-mounted short range communication unit 18 performs communication by radio with a mobile short range communication unit 28A that lies within a communicable range. The communicable range may include at least the own vehicle interior, or the vicinity of the own vehicle, such as a range of a few meters, for example, may be the communicable range. The vehicle-mounted short range communication unit 18 establishes communication with the mobile short range communication unit 28A by means of a predetermined procedure before sending and receiving data to and from the mobile short range communication unit 28A. In the present embodiment, the establishment of communication is also referred to as a "connection". When establishing communication with the mobile short range communication unit 28A, the vehicle-mounted short range communication unit 18 transmits a signal to confirm presence ("presence confirmation" hereinbelow) at regular intervals in order to confirm that the mobile short range communication unit 28A is in a communicable range. Because the mobile short range communication unit 28A sends back a predetermined response upon receiving the presence confirmation, if this response is not obtained, the vehicle-mounted short range communication unit 18 determines that the mobile short range communication unit 28A has moved out of the communicable range, that is, that the connection with the mobile terminal 2 has been broken.

The map DB 19 is a database in which road information and POI (Point Of Interest) information are stored. This POI also includes the home of the user, which the user has input beforehand. The vehicle-mounted controller 11 calculates a travel route from a current location to a destination parking lot by referring to the map DB 19. Note that, as will be described subsequently, this destination parking lot is relayed from the mobile terminal 2.

The mobile terminal 2 is provided with a mobile controller 21, a mobile display unit 22, a loudspeaker 22A, a vibrator 22B, a mobile input unit 23, a mobile GPS receiver 24, a mobile accelerometer 25, a mobile short range communication unit 28A, a long range communication unit 28B, an event list table 29A, and a notification condition table 29B.

The mobile controller 21 is provided with a CPU, a ROM, and a RAM, which are not illustrated. The CPU realizes functions (described subsequently) by expanding a program, which is stored in the ROM, in the RAM and executing the program. The mobile controller 21 outputs operating instructions to the mobile display unit 22, the loudspeaker 22A, the vibrator 22B, the mobile short range communication unit 28A, and the long range communication unit 28B.

The mobile display unit 22 is, for example, a liquid crystal display, and displays video on the basis of operating instructions from the mobile controller 21. The loudspeaker 22A outputs speech on the basis of operating instructions from the mobile controller 21. The vibrator 22B reports to the user by vibrating on the basis of operating instructions from the mobile controller 21. The mobile input unit 23 is configured comprising a plurality of buttons, and relays user inputs to the mobile controller 21, for example. However, the mobile input unit 23 may also be configured as a touch panel which is integral to the mobile display unit 22.

The mobile GPS receiver 24 receives radio waves from a plurality of satellites constituting a satellite navigation system and calculates the position, that is, the latitude and longitude, of the mobile terminal 2 by analyzing the signals contained in the radio waves. The mobile GPS receiver 24 outputs the calculated latitude and longitude to the mobile controller 21. The mobile accelerometer 25 is a triaxial accelerometer, for example. When a user, who is wearing the mobile accelerometer 25, moves by walking and so forth, the acceleration is measured in response to limb movement or center of gravity movement. The mobile accelerometer 25 outputs the measured acceleration to the mobile controller 21.

The mobile short range communication unit 28A is a communication device with a narrow communication range that is Bluetooth (registered trademark)—compatible or IEEE 802.11-compatible, for example. The mobile short range communication unit 28A performs communication by radio with the vehicle-mounted short range communication unit 18 that lies within a communicable range. The mobile short range communication unit 28A establishes communication with the vehicle-mounted short range communication unit 18 by means of a predetermined procedure before sending and receiving data to and from the vehicle-mounted short range communication unit 18. The mobile short range communication unit 28A sends back a predetermined response upon receiving a presence confirmation from the vehicle-mounted short range communication unit 18 and informs the vehicle-mounted short range communication unit 18 of its presence within the communicable range. The long range communication unit 28B is a radio communication device with a wider communicable range than at least the mobile short range communication unit 28A. The long range communication unit 28B is, for example, a 3G/4G-compatible communication module that is capable of connecting to a mobile phone network. The long range communication unit 28B performs communication with the server 3.

The event list table 29A and the notification condition table 29B are storage areas secured in a storage unit (not illustrated) which the mobile terminal 2 is provided with, such as a ROM or a flash memory, for example. Specific examples of the event list table 29A and the notification condition table 29B are described subsequently. The event list table 29A stores, for each event, conditions for determining the respective events. In other words, the event list table 29A indicates correspondence between conditions and events. However, in the event list table 29A, the conditions for the respective events are preconfigured so that a plurality of events are not applicable in a certain state. The notification condition table 29B stores information indicating the relationships between events and notifications, that is, what kind of notification is issued for each event. There may be one or a plurality of notifications corresponding to the events. Furthermore, priority levels are configured for the notifications, and when a plurality of notifications correspond to one event, notifications are issued, starting with the notification with the highest priority level.

The server 3 is provided with a server controller 31, a server map DB 39, and a server communication unit (not illustrated). The server controller 31 is provided with a CPU, a ROM, and a RAM, which are not illustrated. The CPU realizes functions (described subsequently) by expanding a program, which is stored in the ROM, in the RAM and executing the program. The server map DB 39 is a database in which road information and POI information are stored. The server communication unit communicates with the mobile terminal 2.

(Event List Table 29A)

FIG. 2 is a diagram illustrating an example of the event list table 29A. The event list table 29A illustrated in FIG. 2 stores six events, namely, a mid-journey rest, parking lot arrival, wrong-way travel, arrival at destination, designated time, and return home, as well as conditions for determining each of the events. For example, according to the example in FIG. 2, the mobile terminal 2 determines that the "mid-journey rest" event has occurred when the current position is on a travel route and is a position other than the destination parking lot or the destination. Furthermore, when the current position is the destination parking lot, the mobile terminal 2 determines that the "parking lot arrival" event has occurred.

(Notification Condition Table 29B)

FIG. 3 is a diagram illustrating an example of the notification condition table 29B. The notification condition table 29B illustrated in FIG. 3 illustrates which of the foregoing six events a plurality of notifications correspond to. Furthermore, as illustrated in the far left column, the priority level rises the closer the notification is to the top of the table, and the priority level drops the closer the notification is to the bottom of the table. The ranking of priority levels may also be reflected in the order in which notifications are issued or may be reflected in the characterization of notifications, for example. In other words, a notification with a high priority level may be displayed on the mobile display unit 22 first or notifications with increasingly high priority levels may be displayed using a wider surface area of the mobile display unit 22. Furthermore, a notification for which "Y" is indicated for "confirmation" in the second column from the left indicates that a confirmation of whether or not to display notification content is to be performed, and a notification for which "–" is indicated for "confirmation" indicates that the display is executed without performing the confirmation.

For example, upon determining that an "arrival at destination" event has occurred, the mobile controller 21 performs processing as follows. First, the mobile controller 21 refers to the notification condition table 29B and determines that the display content items for which a circle has been added to the column "arrival at destination" are "recommendation information" and "ETC charge". Next, the mobile controller 21 determines that "recommendation information" has the higher priority level of these two display content items and that confirmation is required for "recommendation information" and confirmation is not required for "ETC charge". Hence, the mobile controller 21 first inquires whether or not to display the recommendation information and displays the recommendation information only when an affirmative response is received, before then displaying the ETC charge.

(Function Configuration)

Figure 4:
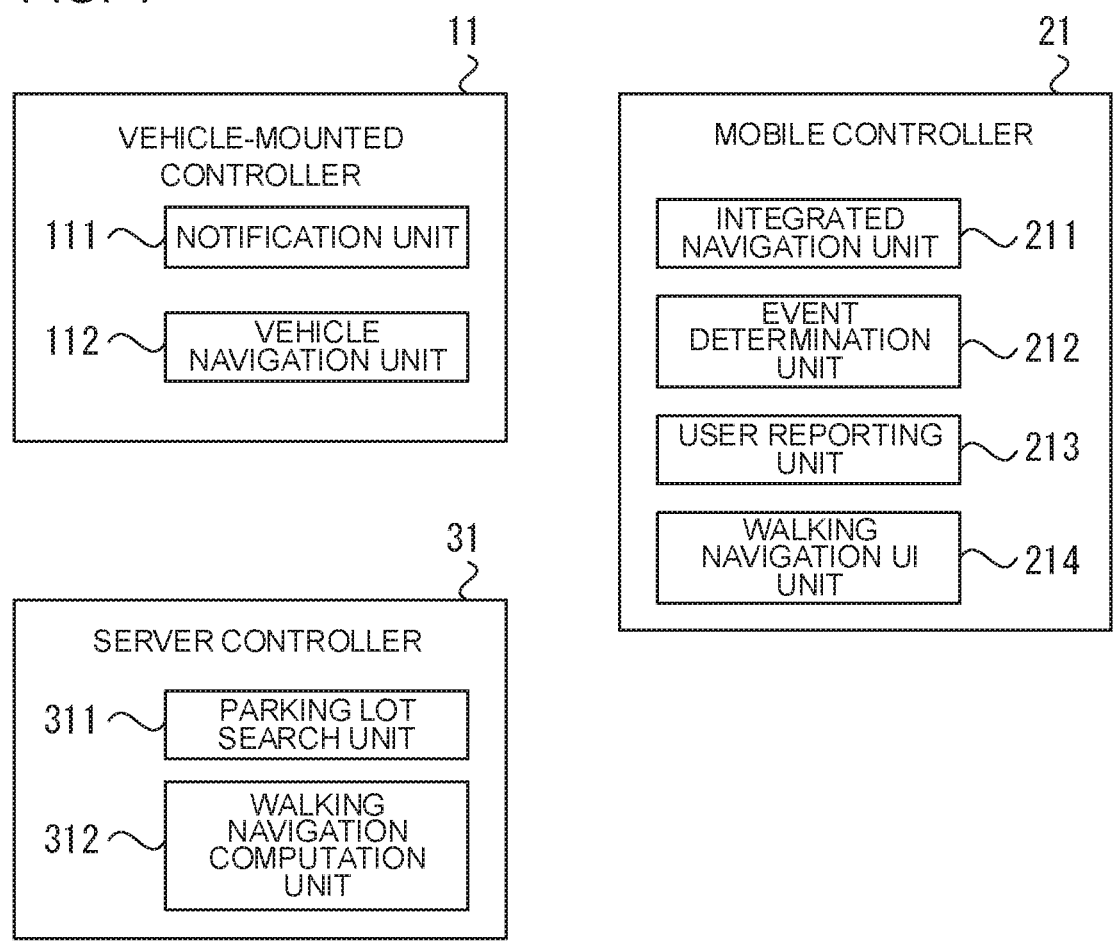
FIG. 4 is a diagram illustrating a configuration of the functions of a vehicle-mounted controller 11, a mobile controller 21, and a server controller 31.

FIG. 4 is a diagram illustrating a configuration of the functions of the vehicle-mounted controller 11, the mobile controller 21, and the server controller 31. The vehicle-mounted controller 11 is provided with a notification unit 111 and a vehicle navigation unit 112. The mobile controller 21 is provided with an integrated navigation unit 211, an event determination unit 212, a user reporting unit 213, and a walking navigation UI unit 214. The server controller 31 is provided with a parking lot search unit 311 and a walking navigation computation unit 312. The vehicle-mounted controller 11 realizes the notification unit 111 and the vehicle navigation unit 112 as a result of the CPU of the vehicle-mounted device 1 executing a program stored in the ROM of the vehicle-mounted device 1. As a result of the CPU of the mobile terminal 2 executing the program stored in the ROM of the mobile terminal 2, the mobile controller 21 realizes the integrated navigation unit 211, the event determination unit 212, the user reporting unit 213, and the walking navigation UI unit 214. The server controller 31 realizes the parking lot search unit 311 and the walking navigation computation unit 312 as a result of the CPU of the server 3 executing the program stored in the ROM of the server 3.

The notification unit 111 transmits a confirmation required stop notification and a normal stop notification to the mobile terminal 2, as will be described in detail subsequently. The vehicle navigation unit 112 refers to the map DB 19 to calculate a travel route to a destination parking lot which has been input from the mobile terminal 2. The vehicle navigation unit 112 then outputs information of the calculated travel route to the vehicle-mounted display unit 12. The vehicle navigation unit 112 may update the information displayed on the vehicle-mounted display unit 12 on the basis of position information acquired from the vehicle-mounted GPS receiver 14 and the direction of travel of the own vehicle acquired from the gyro sensor 16.

The integrated navigation unit 211 integrates vehicle navigation and walking navigation. The integrated navigation unit 211 first acquires a destination which is input by the user using the mobile input unit 23. The integrated navigation unit 211 transmits this destination information to the server 3 and acquires information on the parking lot nearest to the destination, that is, the destination parking lot. The integrated navigation unit 211 then transmits the destination information received from the server 3 to the vehicle-mounted device 1 and causes the vehicle-mounted device 1 to execute vehicle navigation. Upon receiving a confirmation required stop notification or a normal stop notification from the vehicle-mounted device 1, the integrated navigation unit 211 then outputs operating instructions to the event determination unit 212, the user reporting unit 213, and the walking navigation UI unit 214 by means of processing that will be described subsequently.

The event determination unit 212 determines an event by means of the operating instructions from the integrated navigation unit 211. The event determination unit 212 determines the event that corresponds to the current status among the events listed in the event list table 29A on the basis of the current position output by the mobile GPS receiver 24, the destination input by the user, the parking lot determined from the destination, and home information, and so forth. The user reporting unit 213 refers to the notification condition table 29B to make reports and inquiries to the user on the basis of the event determined by the event determination unit 212. Such reports and inquiries are made, as necessary, by using the mobile display unit 22, the loudspeaker 22A, and the vibrator 22B.

The walking navigation UI unit 214 executes walking navigation by using information received from the walking navigation computation unit 312 of the server 3, that is, executes a display of route information on the mobile display unit 22. The walking navigation UI unit 214 does not perform walking route calculations. The walking navigation UI unit 214 may create video information displayed on the mobile display unit 22 on the basis of received walking route information and the position information output by the mobile GPS receiver 24. Furthermore, each time the mobile GPS receiver 24 outputs position information, the walking navigation UI unit 214 may transmit the position information to the server 3 and may receive the video information created by the walking navigation computation unit 312 and display the video information on the mobile display unit 22.

The parking lot search unit 311 refers to the server map DB 39 to search for the parking lot nearest to the destination which has been input from the mobile terminal 2.

The parking lot search unit 311 then transmits information representing the parking lot thus searched for, such as, for example, the latitude and longitude of the parking lot, to the mobile terminal 2. The walking navigation computation unit 312 refers to the server map DB 39 to calculate the walking route enabling the user to reach the destination on foot on the basis of the current position and destination of the mobile terminal 2 which has been input from the mobile terminal 2. The walking navigation computation unit 312 transmits walking route information to the mobile terminal 2.

(Screen Display)

FIG. 5 is a diagram illustrating a display screen that is displayed on the mobile display unit 22 by the user reporting unit 213. FIG. 5(*a*) is a diagram illustrating a vehicle exit confirmation screen, FIG. 5(*b*) is a diagram illustrating a walking navigation start confirmation screen, and FIG. 5(*c*) is a diagram illustrating a return home time notification screen. A message inquiring whether or not the user has exited the vehicle and "Yes" and "No" options for indicating a response to the message are displayed on the vehicle exit confirmation screen illustrated in FIG. 5(*a*), The user selects either option to relay to the mobile terminal 2 whether or not they have exited the vehicle.

A message inquiring whether or not walking navigation has started and "Yes" and "No" options for indicating a response to the message are displayed on the walking navigation start confirmation screen illustrated in FIG. 5(*b*). When the user selects "Yes", walking navigation is started, and when walking navigation ends, the ETC charge up to that point on the day, a display to the effect that coin-operated parking usage has started, and a coin-operated parking charge are displayed. When the user selects "No", walking navigation is omitted and the ETC charge up to that point on the day, a display to the effect that coin-operated parking usage has started, and a coin-operated parking charge are displayed.

The return home time notification screen illustrated in FIG. 5(*c*) displays the fact that a return home start time has been reached and displays a return home time which has been set beforehand. In the notification condition table 29B illustrated in FIG. 3, because the value in the "confirmation" column of the notification condition table 29B is "–", options are not displayed, unlike the walking navigation start confirmation screen illustrated in FIG. 5(*b*).

(Flowchart of Vehicle-Mounted Controller 11)

Figure 6:
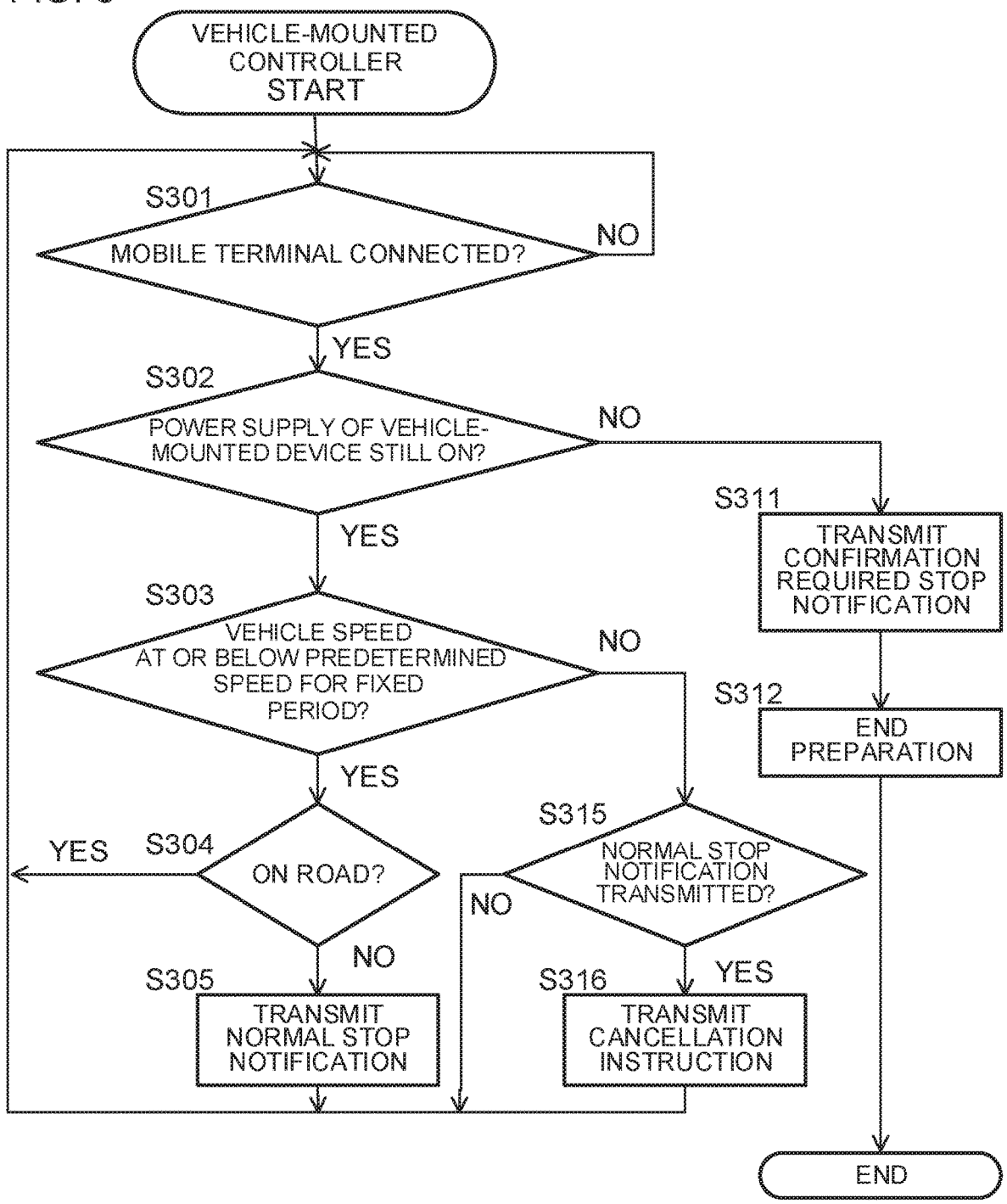
FIG. 6 is a flowchart representing the operation of the vehicle-mounted controller 11.

FIG. 6 is a flowchart representing the operation of the notification unit 111 of the vehicle-mounted controller 11. The vehicle-mounted controller 11 starts the operation illustrated in FIG. 6 when the power supply of the vehicle-mounted device 1 is turned on, in a case where the ignition switch of the own vehicle is turned on, and so forth.

The vehicle-mounted controller 11 first determines in S301 whether or not the mobile terminal 2 is connected to the vehicle-mounted device 1, in other words, whether or not communication with the mobile terminal 2 has been established. When the vehicle-mounted controller 11 determines that the mobile terminal 2 is connected, that is, when a response to a presence confirmation is received at regular intervals from the mobile terminal 2, the vehicle-mounted controller 11 advances to S302, and when the vehicle-mounted controller 11 determines that the mobile terminal 2 is not connected, that is, when a response to a presence confirmation from the mobile terminal 2 is interrupted, the vehicle-mounted controller 11 remains in S301. In S302, the vehicle-mounted controller 11 determines whether or not the power supply of the vehicle-mounted device 1 is still in an on state. In other words, in this step, the vehicle-mounted controller 11 confirms that the ignition switch of the own vehicle has not been turned off and that the power button of the vehicle-mounted device 1 has not been pressed. Upon determining that the power supply is still in an on state, the vehicle-mounted controller 11 advances to S303, and upon determining that the power supply is no longer in an on state, the vehicle-mounted controller 11 advances to S311.

In S303, the vehicle-mounted controller 11 determines whether or not the speed of the own vehicle is at or below a predetermined speed, for example at or below 2 km per hour, for a fixed period. Upon determining that the speed of the own vehicle is at or below a predetermined speed for a fixed period, the vehicle-mounted controller 11 advances to S304, and upon making a negative determination, the vehicle-mounted controller 11 advances to S315. In step S304, the vehicle-mounted controller 11 determines, from the position of the own vehicle, which is output by the vehicle-mounted GPS receiver 14, and from information of the map DB 19, whether or not the own vehicle is on the road. For example, an affirmative determination is made in S304 when waiting at a stop light on the road, and a negative determination is made in S304 when the vehicle has stopped in a parking lot. The vehicle-mounted controller 11 returns to S301 when an affirmative determination is made in S304 and advances to S305 when a negative determination is made.

In S305, the vehicle-mounted controller 11 transmits a normal stop notification to the mobile terminal 2 via the vehicle-mounted short range communication unit 18 and returns to S301, In S311, which is executed when a negative determination is made in S302, the vehicle-mounted controller 11 transmits a confirmation required stop notification to the mobile terminal 2 via the vehicle-mounted short range communication unit 18, and then in S312, performs an end preparation for the vehicle-mounted device 1 and ends the operation of the vehicle-mounted device 1. Note that the end preparation of the vehicle-mounted device 1 is processing in which information stored in the RAM is stored in nonvolatile memory (not illustrated) so as to enable previous processing to be continued when the power supply is then turned on, for example. In S315, which is executed when a negative determination is made in S303, the vehicle-mounted controller 11 determines whether or not a normal stop notification has been transmitted. Upon determining that a normal stop notification has been transmitted, the vehicle-mounted controller 11 transmits a cancellation instruction to the mobile terminal 2 (S316) and returns to S301. Upon determining that a normal stop notification has not been transmitted, the vehicle-mounted controller 11 returns to S301.

(Flowchart of Mobile Controller 21)

Figure 7:
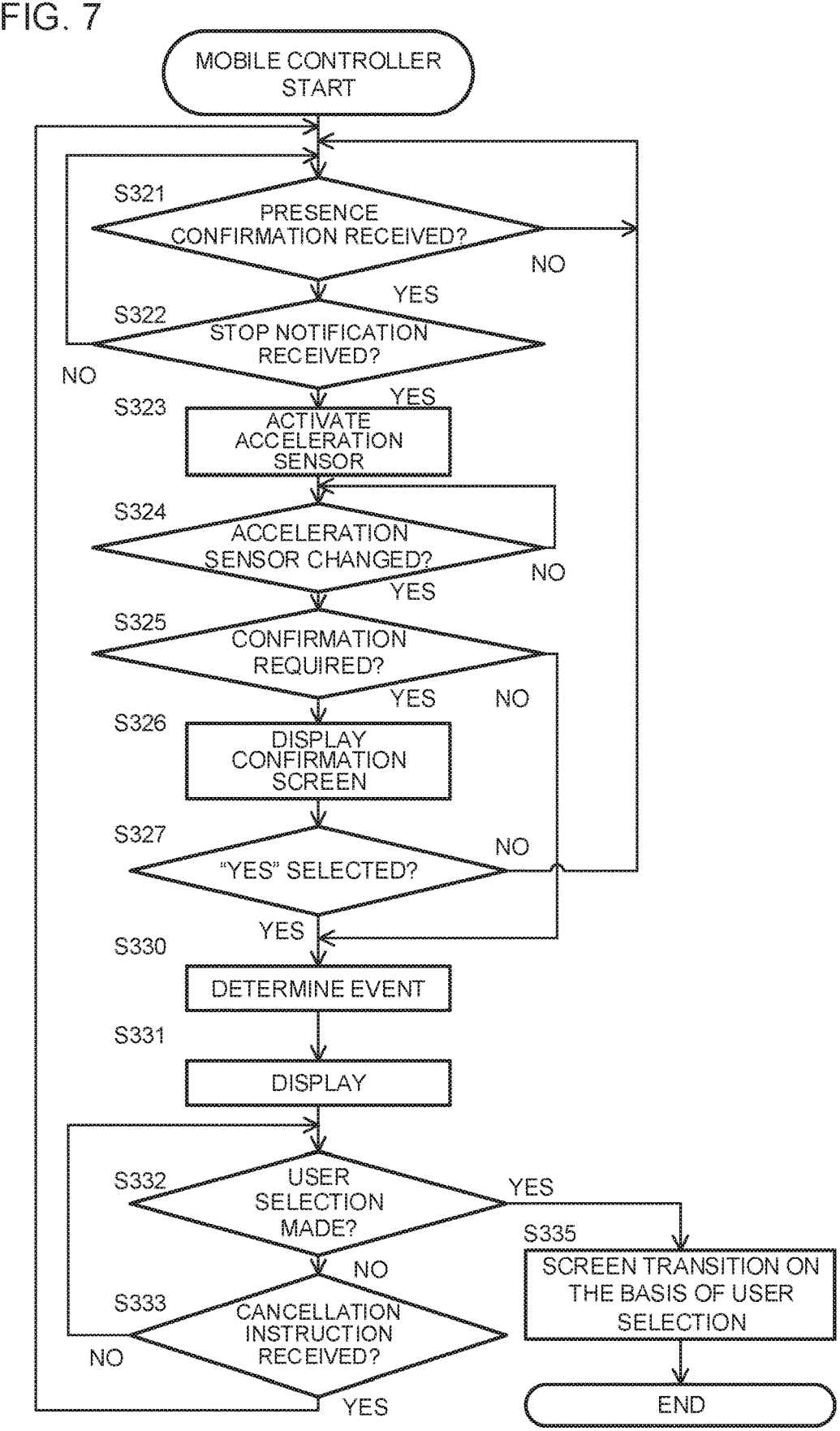
FIG. 7 is a flowchart representing the operation of the mobile controller 21.

FIG. 7 is a flowchart representing the operation of the integrated navigation unit 211 of the mobile controller 21. More specifically, FIG. 7 is a flowchart representing the operation after the integrated navigation unit 211 has transmitted destination parking lot information to the vehicle-mounted device 1.

In step S321, the mobile controller 21 first determines whether or not a presence confirmation has been received from the vehicle-mounted device 1. When the mobile controller 21 determines that a presence confirmation has been received, the mobile controller 21 sends back a response to the presence confirmation and advances to S322, and upon determining that a presence confirmation has not been received, the mobile controller 21 remains in S321. In S322, the mobile controller 21 determines whether or not a stop notification, that is, a normal stop notification or a confirmation required stop notification, has been received from the vehicle-mounted device 1. Upon determining that either notification or both notifications have been received, the mobile controller 21 advances to S323, and upon determining that neither notification has been received, the mobile controller 21 returns to S321. In S323, the mobile controller 21 activates the mobile accelerometer 25 and, in the next step S324, determines whether or not the output of the mobile accelerometer 25 has changed, in other words, whether or not acceleration in any direction has been applied to the mobile terminal 2. Upon determining that the output of the mobile accelerometer 25 has changed, the mobile controller 21 advances to S325, and upon determining that the output has not changed, the mobile controller 21 remains in S324. This step focuses on changes in acceleration when the user has exited the vehicle after the own vehicle stops or when the user is moving on foot.

In S325, the mobile controller 21 determines whether or not a stop notification for which confirmation is required is received, in other words, whether or not the received stop notification is a confirmation required stop notification. Upon determining that a confirmation required stop notification has been received, the mobile controller 21 advances to S326 and displays the vehicle exit confirmation screen illustrated in FIG. 5(*a*) on the mobile display unit 22. Thereafter, in S327, the mobile controller 21 determines whether or not "Yes" has been selected by the user, advancing to S330 upon determining that "Yes" has been selected, and returning to S321 upon determining that "No" has been selected. If a negative determination is made in S325, the mobile controller 21 advances to S330. Note that, in cases where both a confirmation required stop notification and a normal stop notification are received, the mobile controller 21 prioritizes the normal stop notification and makes a negative determination in S325.

In S330, the mobile controller 21 makes an event determination and then, in S331, executes a display on the basis of the determined event. Subsequently, in S332, the mobile controller 21 determines whether or not the user has selected either option, and upon determining that a selection has been made, advances to S335, performs screen transitions based on the user selection, and ends the processing illustrated in FIG. 7. Upon determining that the user has not made any selection in S332, the mobile controller 21 advances to S333. In S333, the mobile controller 21 determines whether or not a cancellation instruction has been received from the vehicle-mounted device 1. Upon determining that a cancellation instruction has been received, the processing returns to S321, and upon determining that a cancellation instruction has not been received, the processing returns to S332.

According to the foregoing embodiment, the following actions and effects are obtained. (1) The vehicle-mounted device 1 is installed in the own vehicle and is provided with the vehicle-mounted short range communication unit 18 that communicates with the mobile terminal 2, the vehicle speed acquiring unit 17 that acquires operation information of the own vehicle, and the vehicle-mounted controller 11. On the basis of the operating status of the vehicle-mounted device 1, the vehicle-mounted controller 11 transmits a first notification notifying the mobile terminal 2 of the possibility that the vehicle has stopped, that is, a confirmation required stop notification, to the mobile terminal 2 via the vehicle-mounted short range communication unit 18. On the basis of the operation information of the own vehicle, the vehicle-mounted controller 11 transmits a second notification which is a notification relaying the fact that the own vehicle has stopped to the mobile terminal 2, that is, a normal stop notification, to the mobile terminal 2 via the vehicle-mounted short range communication unit 18. That is, the vehicle-mounted device 1 transmits, to the mobile terminal 2, not only a normal stop notification issuing notice that the own vehicle has stopped but also a confirmation required stop notification to issue notice of the possibility that the own vehicle has stopped. Hence, the vehicle-mounted device 1 is capable of distinguishing between the transmission, to the mobile terminal 2, of a confirmation required stop notification and the transmission of a normal stop notification and is capable of notifying the mobile terminal 2 of the possibility that the own vehicle has stopped.

(2) The vehicle-mounted controller 11 transmits a confirmation required stop notification when turning off the power supply of the vehicle-mounted device 1. For example, a normal stop notification cannot be transmitted in a case where the ignition switch has been turned off after the driver of the own vehicle has made a sudden stop. However, in such a case, the vehicle-mounted controller 11 is capable of transmitting a confirmation required stop notification and of issuing notice of the possibility that the own vehicle has stopped.

(3) The vehicle-mounted controller 11 transmits a normal stop notification upon determining that the speed of the own vehicle is at or below a predetermined speed for a fixed period and that the own vehicle is not on the road. Hence, the vehicle-mounted device 1 is capable of transmitting a normal stop notification if it is probable that the own vehicle has stopped, as in a case where a state of substantially zero speed in a parking lot continues for a predetermined period, or the like.

(4) The vehicle-mounted controller 11 transmits, to the mobile terminal 2, a cancellation instruction which is a signal for canceling a normal stop notification in a case where the speed of the own vehicle is above a predetermined speed and where a normal stop notification has been transmitted (S316 in FIG. 6). The vehicle-mounted device 1 is therefore capable of preventing unnecessary operation of the mobile terminal 2. For example, when the vehicle is stopped to settle the bill at the exit from a parking lot and the vehicle starts moving after payment has been made, the vehicle-mounted device 1 ends up transmitting a normal stop notification when the vehicle is stopped to settle the bill. In the absence of any countermeasure by the vehicle-mounted device 1, the mobile controller 21 activates the acceleration sensor (S322: YES, S323), and as a result of the own vehicle traveling, the output of the acceleration sensor changes (S324: YES). In addition, because the notification received by the mobile terminal is a normal stop notification, confirmation is unnecessary (S325: NO) and an event determination and display are executed (S330, S331). However, by transmitting a cancellation instruction to the mobile terminal 2, the vehicle-mounted controller 11 is able to reset the operation of the mobile controller 21, that is, perform recovery to a state before receiving the normal stop notification (S333: YES, S321). Thus, an unnecessary operation such as a display on the mobile display unit 22 can be prevented.

(5) The confirmation required stop notification is a notification that causes a person holding the mobile terminal 2 to confirm that they have exited the own vehicle. Hence, by way of confirmation with the user, the mobile terminal 2 is capable of accurately determining that the user has exited the vehicle.

Modification Example 1

The vehicle-mounted controller 11 may establish, as a condition, that a confirmation required stop notification, required when the ignition switch is turned off, is transmitted to the mobile terminal 2 (S302: NO, S311 in FIG. 6) but that a normal stop notification is not transmitted.

Figure 8:
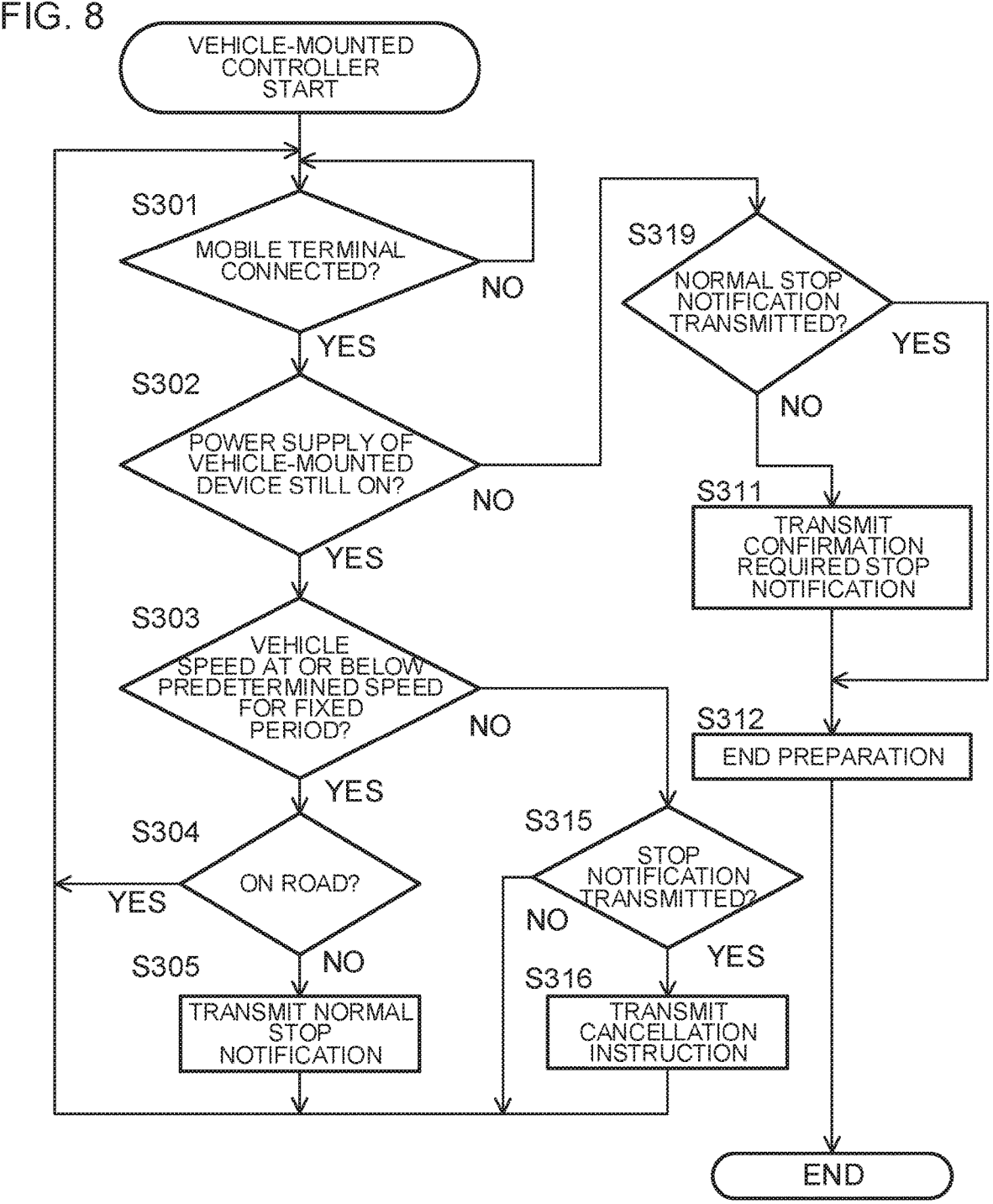
FIG. 8 is a flowchart representing the operation of a notification unit 111 in a modification example 1.

FIG. 8 is a flowchart representing the operation of the notification unit 111 in a modification example 1. FIG. 8 differs from FIG. 6 in that S319 has been added. S319 is executed when a negative determination is made in S302. In S319, the notification unit 111 determines whether or not a normal stop notification has been transmitted. Upon determining that a normal stop notification has been transmitted, the notification unit 111 advances to S312, and upon determining that a normal stop notification has not been transmitted, the notification unit 111 advances to S311. However, even when a normal stop notification has been transmitted, the notification unit 111 determines that the normal stop notification has not been transmitted when a cancellation instruction is subsequently transmitted.

According to this modification example, the mobile terminal 2 does not receive an unnecessary confirmation required stop notification when the ignition switch is turned off, and hence redundant exception handling can be omitted.

Modification Example 2

The vehicle-mounted short range communication unit 18 may perform communication with the mobile short range communication unit 28A of the mobile terminal 2 by using a wired connection such as a USB cable or an IEEE 1394-compatible cable, for example. In this case, the vehicle-mounted controller 11 may confirm the presence of the mobile terminal 2 by using an electrical characteristic such as a resistance value or a voltage, for example, resulting from the cable connection.

Modification Example 3

Although the server 3 is provided with the parking lot search unit 311 in this embodiment, the mobile terminal 2 and the vehicle-mounted device 1 may be provided with the parking lot search unit 311. When the mobile terminal 2 is provided with the parking lot search unit 311, the mobile terminal 2 is also provided with a database for searching for a destination parking lot, such as the server map DB 39, for example. When the vehicle-mounted device 1 is provided with the parking lot search unit 311, the mobile terminal 2 transmits information on the destination, which has been input by the user, to the vehicle-mounted device 1.

Modification Example 4

The notification condition table 29B need not be provided with the information in the "confirmation" column, which is the second column from the left of FIG. 3. In this case, confirmation may be performed for all notifications, or a screen display may be executed without performing confirmation for all notifications.

Modification Example 5

In S326 of FIG. 7, the mobile controller 21 inquires, as illustrated in FIG. 5(*a*), whether or not the user has exited the own vehicle. However, the mobile controller 21 may also inquire whether or not the own vehicle has stopped.

Although it is assumed that a program is stored in a ROM (not illustrated) provided in each device, the program may also be stored in a nonvolatile memory (not illustrated) provided in each device. Furthermore, each device is provided with an I/O (input/output) interface (not illustrated) and, where necessary, a program may be read in from another device via the I/O interface and a medium that can be used by each device. Here, medium refers, for example, to a storage medium that is detachably attached to an I/O interface, or to a communication medium, that is, a network such as a wired, wireless, or optical network, or to a carrier wave or a digital signal that is propagated through the network. Furthermore, some or all of the functions realized by a program may also be realized by a hardware circuit or an FPGA.

Figure 9:
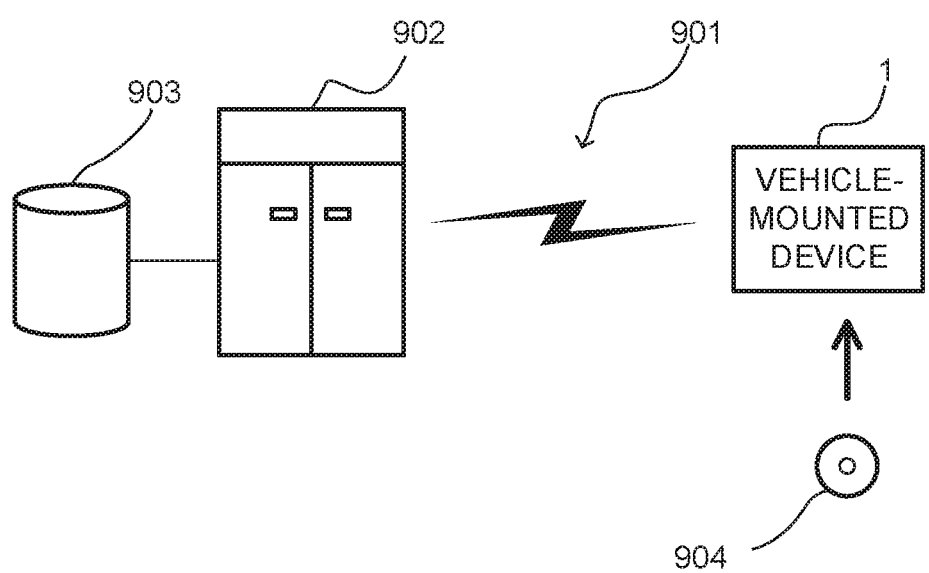
FIG. 9 is a diagram illustrating a program storage medium.

For example, the vehicle-mounted device 1 may be made to read, directly or via a reading device, a recording medium 204 such as a USB memory or a CD-ROM 904 that stores a program, as illustrated in FIG. 9. The vehicle-mounted device 1 may be made to perform reading using a method via a communication line 901 such as a network. When reading is performed via the communication line 901, a program is stored in a storage device 903, or the like, of a server 902 connected to the communication line.

Each of the foregoing embodiments and modification examples may be combined.

Although various embodiments and modification examples have been described hereinabove, the present invention is not limited to the content thereof. Further embodiments conceived within the scope of the technological ideas of the present invention are also included in the scope of the present invention.

The disclosed content of the following application from which priority is claimed is incorporated herein by reference:

Japanese Patent Application No. 2017-216082 (filed on Nov. 9, 2017).

REFERENCE SIGNS LIST

1: Vehicle-mounted device
2: Mobile terminal
3: Server
11: Vehicle-mounted controller
18: Vehicle-mounted short range communication unit
21: Mobile controller
22: Mobile display unit
28B: Long range communication unit
29B: Notification condition table
31: Server controller
111: Notification unit
112: Vehicle navigation unit
211: Integrated navigation unit
212: Event determination unit
213: User reporting unit
214: Walking navigation UI unit
311: Parking lot search unit
312: Walking navigation computation unit

The invention claimed is:

1. A notification system including a vehicle-mounted device installed in a vehicle, comprising:
a wireless transceiver that communicates with a mobile terminal;
a vehicle speed sensor that acquires speed of the vehicle;
a storage device for storing a plurality of events related to an operating status of the vehicle-mounted device, where each event includes a priority level, a notification content and a flag for whether a confirmation is required for said each event, wherein a notification with a higher priority is transmitted before a notification with a lower priority; and
a vehicle-mounted processor that, on the basis of the operating status of the vehicle-mounted device and when a stored flag indicates that a confirmation is required for exiting the vehicle, transmits a first notification to the mobile terminal via the wireless transceiver that causes the mobile terminal to display a confirmation screen to receive confirmation from a person holding the mobile terminal that the person holding the mobile terminal has exited the vehicle and that, on the basis of the speed of the vehicle, transmits a second notification notifying the mobile terminal that the vehicle has stopped, to the mobile terminal via the wireless transceiver.

2. The notification system according to claim 1, wherein the vehicle-mounted processor transmits the first notification when a power supply of the vehicle-mounted device is being turned off.

3. The notification system according to claim 1, wherein the vehicle-mounted processor transmits a second notification upon determining that the speed of the vehicle is at or below a predetermined speed for a fixed period and that the vehicle is not on the road.

4. The notification system according to claim 3, wherein the vehicle-mounted processor transmits, to the mobile terminal, a signal for canceling the transmitted second notification in a case where the speed of the vehicle is above the predetermined speed.

5. A tangible computer-readable recording medium on which is recorded a computer program for causing a notification system including a vehicle-mounted device installed in a vehicle that communicates with a mobile terminal to execute a method comprising:
storing a plurality of events related to an operating status of the vehicle-mounted device, where each event includes a priority level, a notification content and a flag for whether a confirmation is required for said each event, wherein a notification with a higher priority is transmitted before a notification with a lower priority;
acquiring an operating status of the vehicle-mounted device and related stored information about the acquired operating status of the vehicle;
acquiring speed of the vehicle;
transmitting, on the basis of the acquired operating status of the vehicle-mounted device, and when a stored flag indicates that a confirmation is required for exiting the vehicle a first notification to the mobile terminal that causes the mobile terminal to display a confirmation screen to receive confirmation from a person holding the mobile terminal that the person holding the mobile terminal has exited the vehicle; and
transmitting, on the basis of the speed of the vehicle, a second notification notifying the mobile terminal that the vehicle has stopped to the mobile terminal.

6. A notification method executed in a notification system notification system including a vehicle-mounted device installed in a vehicle that communicates with a mobile terminal, the method comprising:
storing a plurality of events related to an operating status of the vehicle-mounted device, where each event includes a priority level, a notification content and a flag for whether a confirmation is required for said each event, wherein a notification with a higher priority is transmitted before a notification with a lower priority;
acquiring an operating status of the vehicle-mounted device and related stored information about the acquired operating status of the vehicle;
acquiring speed of the vehicle;
transmitting, on the basis of the acquired operating status of the vehicle-mounted device, and when a stored flag indicates that a confirmation is required for exiting the vehicle a first notification to the mobile terminal that causes the mobile terminal to display a confirmation screen to receive confirmation from a person holding the mobile terminal that the person holding the mobile terminal has exited the vehicle; and transmitting, on the basis of the speed of the vehicle, a second notification notifying the mobile terminal that the vehicle has stopped to the mobile terminal.

7. The notification method according to claim 6, wherein the first notification is transmitted when a power supply of the vehicle-mounted device is being turned off.

8. The notification method according to claim 6, wherein a second notification is transmitted upon determining that the speed of the vehicle is at or below a predetermined speed for a fixed period and that the vehicle is not on the road.

9. The notification method according to claim 8, wherein a signal for canceling the transmitted second notification is transmitted to the mobile terminal in a case where the speed of the vehicle is above the predetermined speed.

* * * * *